United States Patent [19]
Sekiguchi et al.

[11] Patent Number: 5,172,149
[45] Date of Patent: Dec. 15, 1992

[54] DRIVE APPARATUS AND DRIVE CONTROL APPARATUS FOR OPTICAL SYSTEM OF CAMERA

[75] Inventors: Takaaki Sekiguchi; Isao Hijikata; Yoichi Okabe, all of Yokohama, Japan

[73] Assignee: Victor Company of Japan, Ltd., Yokohama, Japan

[21] Appl. No.: 704,257

[22] Filed: May 22, 1991

[30] Foreign Application Priority Data

May 23, 1990 [JP] Japan .................................. 2-132962
Jul. 10, 1990 [JP] Japan .................................. 2-182466

[51] Int. Cl.⁵ ............................................... G03B 3/10
[52] U.S. Cl. ................................................ 354/195.1
[58] Field of Search ........................ 354/195.1, 195.12; 359/696, 705, 706

[56] References Cited

U.S. PATENT DOCUMENTS

| | | | |
|---|---|---|---|
| 4,002,405 | 1/1977 | Stahl | 354/195.1 X |
| 4,796,045 | 1/1989 | Hamanishi et al. | 354/195.1 |
| 4,851,869 | 7/1989 | Ishimaru et al. | 354/195.1 |
| 4,857,951 | 8/1989 | Nakajima et al. | 354/195.1 X |
| 4,896,179 | 1/1990 | Watanabe et al. | 354/195.1 |

FOREIGN PATENT DOCUMENTS 60-143309 7/1985 Japan .
63-33720 2/1988 Japan .
1549729 8/1979 United Kingdom .

*Primary Examiner*—Michael L. Gellner
*Attorney, Agent, or Firm*—Lowe, Price, LeBlanc & Becker

[57] ABSTRACT

A drive apparatus for driving an optical system of a camera in directions along an optical axis of the optical system through an electric motor. The drive apparatus is equipped with a manual ring provided in a housing of the optical system so as to be manually rotatable about the optical axis of the optical system. The manual ring is fixedly secured to a rotatable plate having a plurality of tooth portions. Also included in the drive apparatus is a rotation detector arranged to be associated with the plurality of tooth portions of the rotatable plate so as to detect the rotation of the manual ring to output a detection signal indicative of the rotation information of the manual ring. A control section is responsive to the detection signal from the rotation detector so as to output a control signal to the electric motor so that the optical system is driven at a speed corresponding to the frequency of the detection signal therefrom. This arrangement allows high-accurate position control of the optical system of the camera at a speed proportional to the rotational speed of the manual ring.

4 Claims, 8 Drawing Sheets

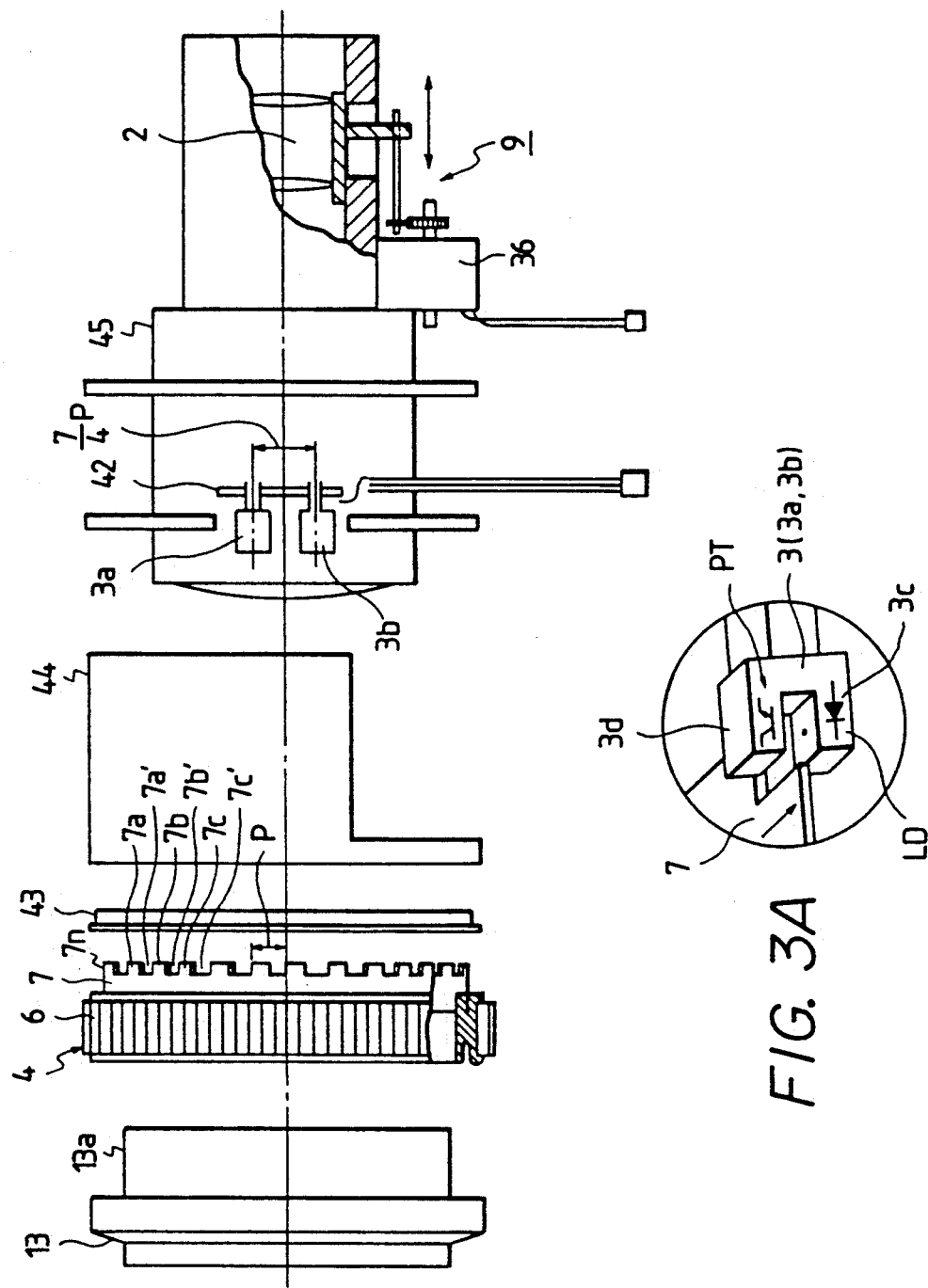

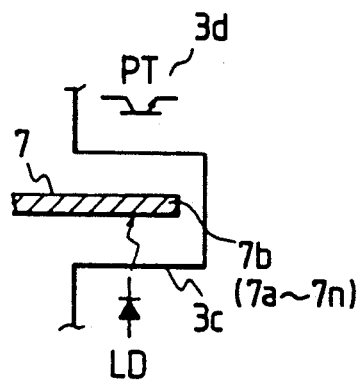
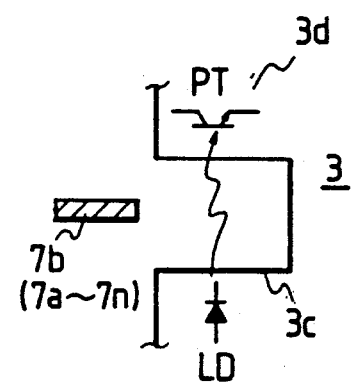
FIG. 5A    FIG. 5B
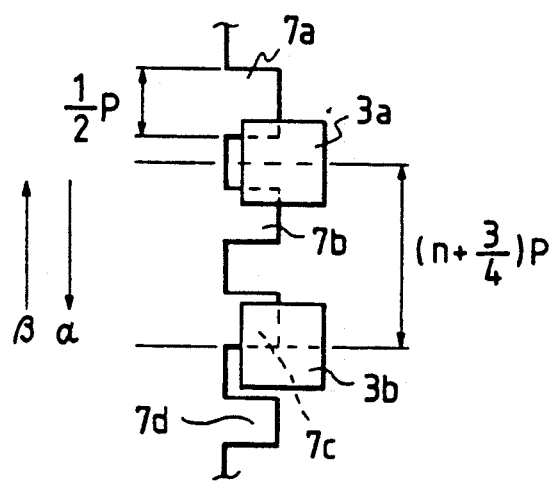
FIG. 6
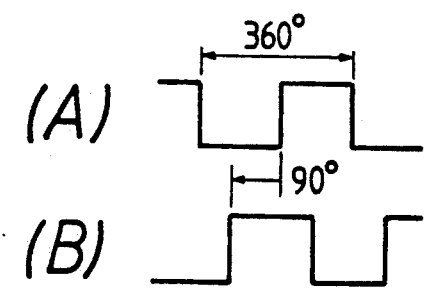
FIG. 7
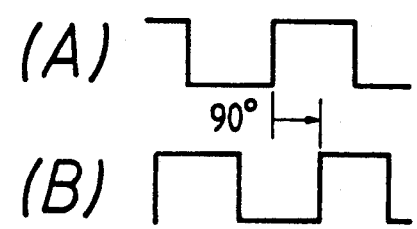
FIG. 8

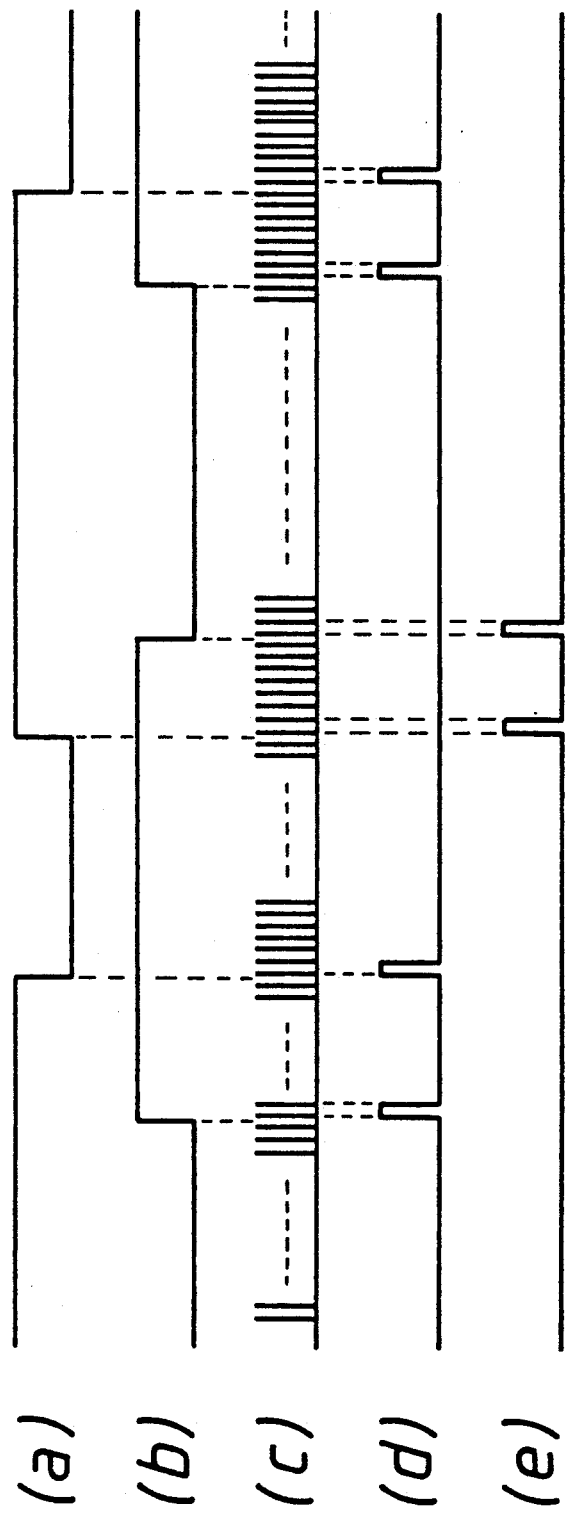

DRIVE APPARATUS AND DRIVE CONTROL APPARATUS FOR OPTICAL SYSTEM OF CAMERA

BACKGROUND OF THE INVENTION

The present invention relates generally to drive apparatus for an optical system of video cameras or the like, and more particularly to a lens drive apparatus suitably applicable to a camera having the auto-focusing function and the zooming function. In addition, this invention relates to a control apparatus for controlling the drive of an optical system of a camera.

Various auto-focusing techniques for use in video cameras or the like have hitherto been proposed which automatically brings the video camera into focus over a wide range. These auto-focusing techniques are generally arranged to bring the camera into focus by moving a portion of an optical system of the camera by a motor in directions along the optical axis of the optical system. However, in cases where the auto-focusing operation is efected by moving the rear side of the optical system, difficulty is encountered to offer the manually operated focusing function to such a camera. That is, because the lens to be moved for the focusing is positioned at the rear side of the optical system, the lens tends to be covered by a housing of the camera so as to make it difficult to manually perform the focusing operation. For eliminating this problem, a small rotatable control can be provided at the housing so as to effect the manual focusing by rotating the small rotatable control by hand, while such an arrangement involves a difficulty to offer a mechanically hand-operated sensation for the user as obtained in a still camera.

Further, in the camera having the focusing function and the zooming function, at least one of the focusing and zooming operations is generally achieved by moving the optical system of the camera by the driving force due to a pulse motor such as disclosed in the Japanese Patent Provisional Publication No. 60-143309 or 63-33720. The movement of the optical system for the focusing or zooming operation is generally effected through a manual switch which is arranged to perform the ON/OFF operation of the pulse motor. In this case, the drive of the pulse motor is effected by a motor drive pulse signal with a constant period which is outputted from a control circuit in correspondance with the ON state of the manual switch, whereby the movement of the optical system is made at a constant speed at the time of the manual operation. However, according to this arrangement, difficulty can be encountered to meet the requirement to perform a fine adjustment to be required at the vicinity of the focusing position. In order to remove this problem, an optical system drive apparatus is known which is equipped with a signal generating means which is arranged so as to generate information including the moving direction and moving amount of the optical system in accordance with the rotational operation mode of a manual ring for the adjustment of the optical system. However, because the rotational operation mode of the manual ring is varied by each user, there is the possibility that the motor drive pulse signal has a frequency above the pulse motor responsible frequency, for instance. In this case, the moving amount of the optical system due to the pulse motor cannot be coincident with the adjustment amount due to the manual ring.

SUMMARY OF THE INVENTION

It is therefore an object of the present invention to provide a lens drive apparatus for use in a camera having the auto-focusing function and the zooming function which is capable of effectively and manually performing the focusing and zooming operation.

A further feature of this invention is to provide a drive control apparatus for an optical system of a camera which is capable of easily and adequately managing the position of the optical system on the basis of the number of the drive pulses to be applied to the pulse motor.

In accordance with the present invention, there is provided a lens drive apparatus for driving an optical system in directions along an optical axis of the optical system, comprising: driving means for driving the optical system in accordance with a control signal; a manual ring provided in a housing of the optical system so as to be manually rotatable about the optical axis; signal generating means coupled to said manual ring so as to generate as a multi-phase output a signal corresponding to a rotation of said manual ring; and control means responsive to the signal from the signal generating means to output the control signal to said driving means in correspondance with the signal therefrom.

In accordance with the present invention, there is further provided a lens drive apparatus for driving an optical system in directions along an optical axis of the optical system, comprising: driving means for driving the optical system in accordance with a control signal; a manual ring provided in a housing of the optical system so as to be manually rotatable about the optical axis; a rotatable plate integrally rotatable with the manual ring, the rotatable plate having a plurality of tooth portions; rotation detecting means arranged to be associated with the plurality of tooth portions of the rotatable plate so as to detect the rotation of the manual ring to output a detection signal indicative of the rotation information of the manual ring; and control means responsive to the detection signal from the rotation detecting means so as to output the control signal to the driving means so that the optical system is driven at a speed corresponding to the frequency of the detection signal therefrom.

Preferably, the rotation detecting means comprises at least two optically detecting devices each equipped with a light-emitting portion and a light-receiving portions between which the plurality of tooth portions of the rotatable plate pass, and the control means is responsive to the output signals of the two optically detecting devices so as to detect a rotational direction of the manual ring on the basis of the phase difference between the output signals of the two optically detecting devices, the control means outputting the control signal to the driving means so that the optical system is driven at the speed corresponding to the frequency of the output signals thereof in a direction corresponding to the detected rotational direction of the manual ring. Further, the two optically detecting devices are disposed to be separated from each other by a distance which is $((\frac{3}{4})+n)$ times the interval of the adjacent tooth portions of the rotatable plate.

In accordance with the present invention, there is still further provided a drive control apparatus for an optical system of a camera having at least one of a focusing function and zooming function, comprising: driving means including a pulse motor to drive the optical system in directions along an optical axis of the optical system in accordance with a drive control signal; a manual ring rotatable by a manual operation; displacement signal generating means coupled to the manual ring so as to generate a displacement signal including information relating to a moving direction and moving amount of the optical system in correspondance with the rotation of the manual ring; drive control means coupled to the displacement signal generating means so as to totalize the displacement signals generated at every predetermined time period to output the drive control signal to the driving means on the basis of the totalized value of the displacement signals when the totalized value is below a predetermined value and output the drive control signal thereto on the basis of the predetermined value when the totalized value exceeds the predetermined value.

Preferably, the drive control means controls the driving means so that the pulse motor is driven in accordance with the drive control signal at the predetermined time period next to the predetermined time period that the drive control signal is obtained.

BRIEF DESCRIPTION OF THE DRAWINGS

The object and features of the present invention will become more readily apparent from the following detailed description of the preferred embodiments taken in conjunction with the accompanying drawings in which:

FIGS. 3 and 3A are an exploded view showing a mechanical arrangement of the lens drive apparatus of the embodiment;

FIGS. 5A and 5B are schematic diagram showing the relation between the photointerrupter and the rotatable plate;

FIG. 6 is a plan view showing the photointerrupter and the rotatable plate;

FIGS. 7 and 8 are illustrations of signals outputted from the photointerrupter in cooperation with the rotatable plate;

FIGS. 10 to 12 are illustration of signal waveforms for describing the operation of the drive control apparatus.

DETAILED DESCRIPTION OF THE INVENTION

Figure 1:
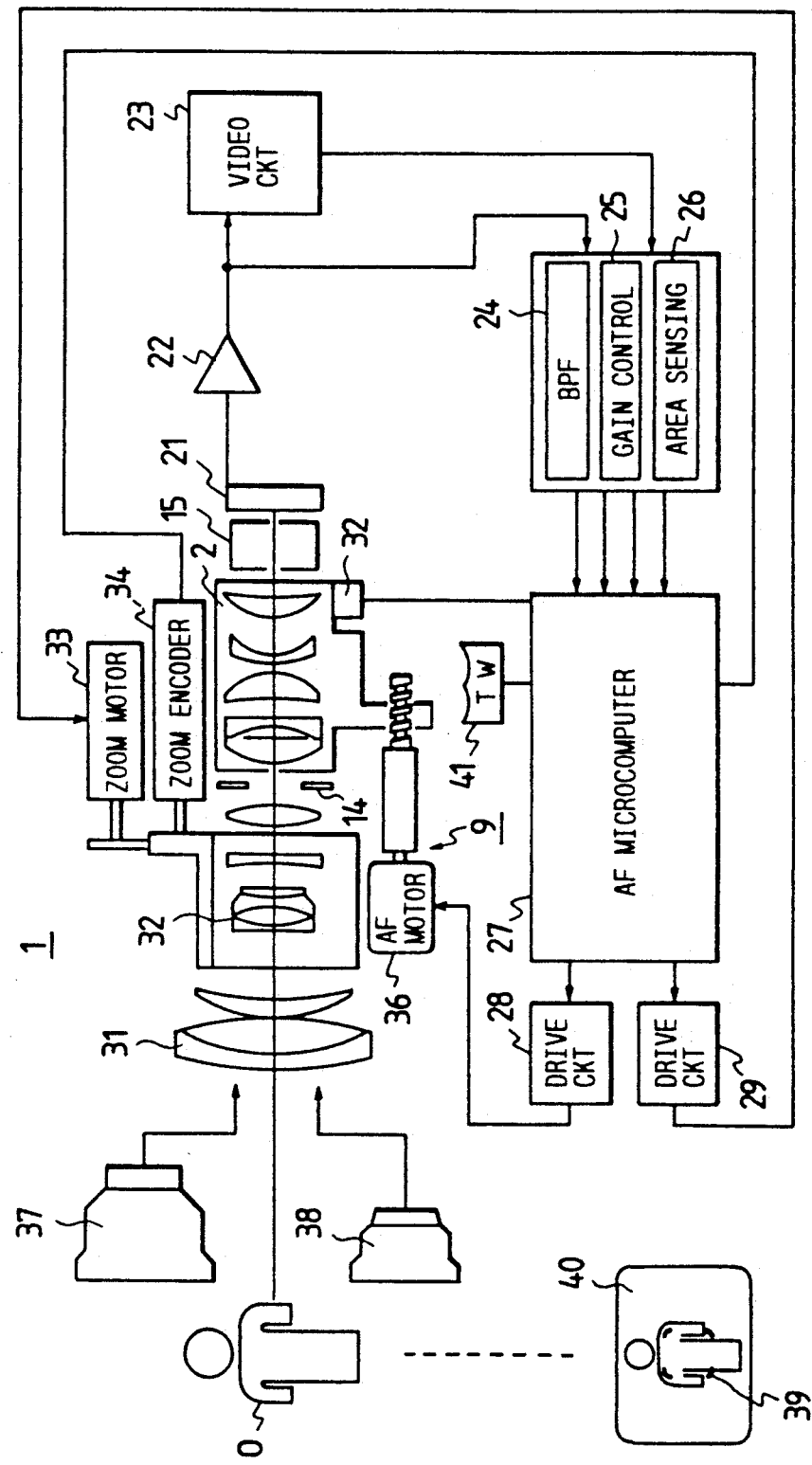
FIG. 1 is an illustration of an arrangement of a conventional rear-side optical system drive apparatus.

Prior to describing the embodiments of this invention, a brief description will be made with reference to FIG. 1 in terms of an arrangement of a conventional rear-side lens movable type video camera for a better understanding of this invention. In FIG. 1, illustrated at numeral 1 is an optical section comprising a front-lens system 31, a zoom-lens system 32, a master-lens (imaging lens) system 2 and an iris diaphram 14. It is also possible to additionally attach a wide-conversion lens 37 and tele-conversion lens 38 to the front side of the front-lens system 31. Further, the video camera includes an optical low-pass filter (LPF) 15, a solid image pickup device such as a CCD 21, an amplifier 22, a video circuit (image signal processing circuit) 23, a band-pass filter (BPF) 24, a gain control amplifier (GCA) 25, an area sensor 26, an auto-focusing (AF) microcomputer 27, drive circuits 28, 29, a zooming switch 41, an infinity sensor 32, a zooming motor 33, a zooming encoder 34, and a lens drive section 9 including an AF motor 36.

When an object O is taken by the video camera, a light beam from the object O passes through the optical section 1 to reach the CCD (charge coupled device) so as to be photoelectrically converted into an image signal. This image signal is supplied to the amplifier 22 to be amplified and then led to the video circuit 23 and others, and further the image signal is supplied to a view finder (not shown) whereby an image 40 is displayed on a screen of the view finder. An auto-focusing (AF) sensing area 39 is set at the vicinity of the image 40 and a signal is supplied to the drive circuit 28 to rotate the AF motor 36 so that the master lens 2 moves in a predetermined direction along the optical axis so as to search the position at which the contrast of the AF sensing area extremely becomes strong. As a result, in the case that the contrast is more weakened, the AF motor 36 is reversely rotated and stopped at the position (focused position) at which the constrast extremely becomes strong, thereby effecting the focusing.

Figure 2:
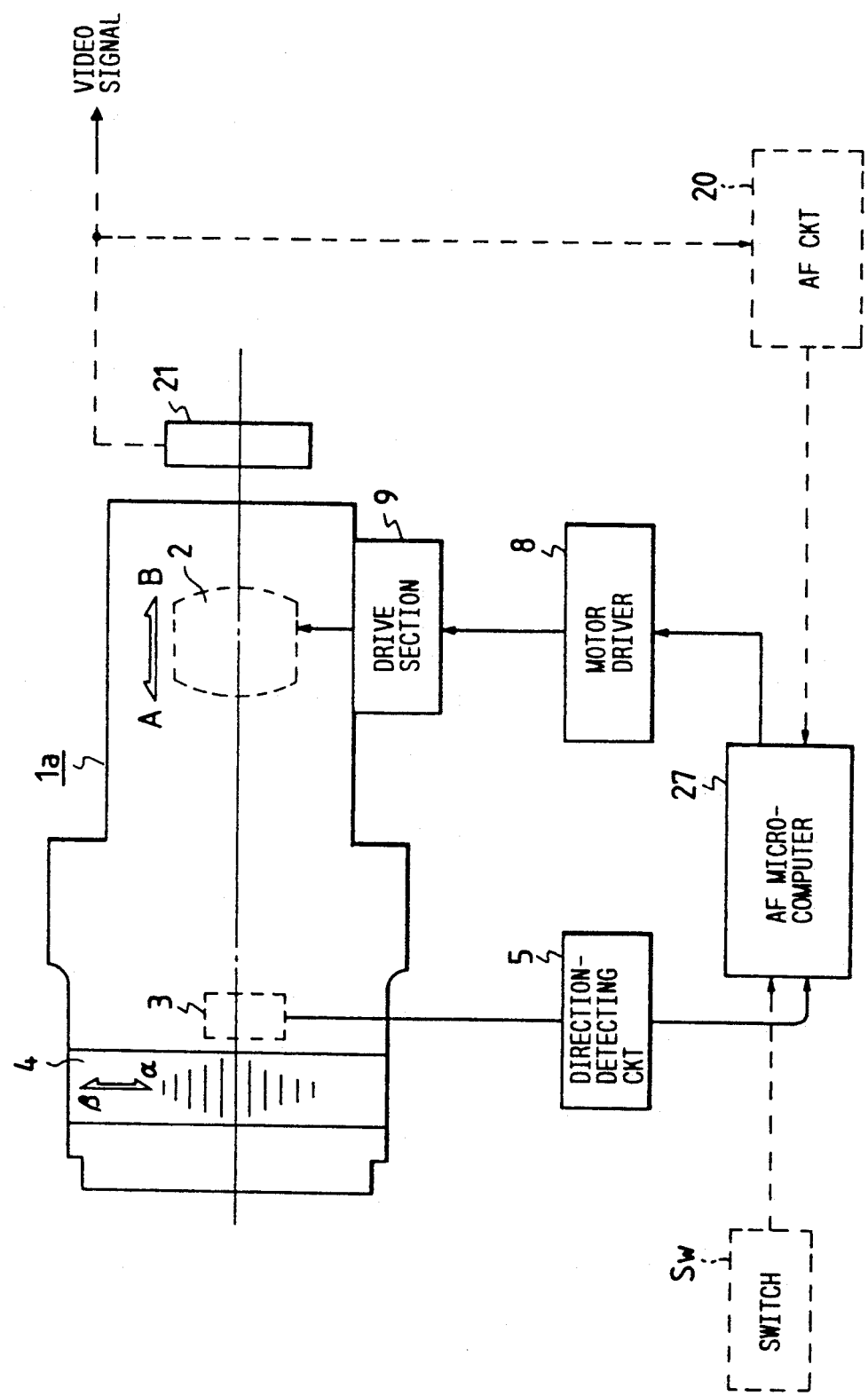
FIG. 2 is a block diagram showing an electrical arrangement of a lens drive apparatus according to an embodiment of the present invention which is incorporated into a video camera.

Referring now to FIGS. 2 and 3, there is schematically illustrated an arrangement of a lens drive apparatus including a control signal system according to a first embodiment of the present invention. In FIGS. 2 and 3, illustrated at numeral 4 is a manual focusing ring rotatably attached to a lens-mounting portion 1a of a camera housing and illustrated at numeral 3 (3a, 3b) are photointerrupters having an arrangement as shown in FIG. 2, the photointerrupter 3 being coupled to a direction detecting circuit 5 which is in turn coupled to an auto-focusing microcomputer 27. A motor driver 8 is responsive to a control signal from the AF microcomputer 27 so as to operate a lens drive section 9. Numeral 20 represents an auto-focusing (AF) circuit and character Sw designates a change-over switch for the manual focusing operation.

As illustrated in FIG. 3, the manual ring 4 is interposed between a front cover 13 and a rear cover 44 (or a decorative ring 43, if required) so as to be rotatable in directions indicated by arrows α and β (see FIG. 2). On the surface of the manual ring 4 there is pasted a skip-proof rubber 6, and to one side surface of the manual ring 4 there is integrally attached a light-shielding plate (rotatable plate) 7 having a plurality of (for example, 82) teeth 7a to 7n. Here, the front lens 31 is arranged so as not to be moved in the directions along the optical axis in response to the rotation of the manual ring 4. Numeral 42 represents a junction plate for fixedly securing the photointerrupters 3a and 3b. As enlarged and shown in a circle, the photointerrupter 3a (or 3b) has the lower (or upper) side portion 3c including therein a light emitting diode LD and the upper (or lower) side portion 3d including therein a light-receiving element PT such as a phototransistor so as to form a gap (optical path) therebetween. The teeth 7a to 7n of the light-shielding plate 7 are arranged so as to pass through the gap between the lower side portion 3c and the upper side portion 3d whereby the teeth 7a to 7n cut off light emitted from the light-emitting diode LD and directed to the light-receiving element PT. On the ther hand, the notch portions 7a' to 7n' allow that the light emitted therefrom reaches the light-receiving element PT. Here, numeral 45 represents a lens-barrel to which the junction plate 42 is attached. The lends-barrel 45 can be inserted into the manual ring 4 so that the front portion of the lens-barrel 45 is engaged with the cylindrical portion 13a of the front cover 13.

The interval (pitch) between the two photointerrupters 3a and 3b is set to $((\frac{3}{4})+n)$ times of the interval (pitch) P of the teeth 7a to 7n where n is a natural number, and the width of the teeth 7a to 7n is set to $(\frac{1}{2})P$. The length of each of the notch portions 7a' to 7n' in the circumferential direction is arranged to be substantially equal to the length of each of the teeth 7a to 7n in the same direction.

Here, even if the manual ring 4 is manually rotated in the direction $\alpha$ or $\beta$, the lens is arranged so as not to be directly moved in the directions along the optical axis. The movement of the lens is allowed only when at least a portion of the teeth 7a to 7n pass through the gaps between the light-emitting portions 3c and light-receiving portions 3d of the two photointerrupters 3a and 3b so as to output a signal including information relating to the rotational direction and rotated amount of the manual ring 4. It is appropriate to use another signal generating device corresponding to the photointerrupter section 3. Further, it is preferable to apply an adequate lubricant on the surface of the cylindrical portion 13a which is brought into contact with the manual ring 4.

Figure 4:
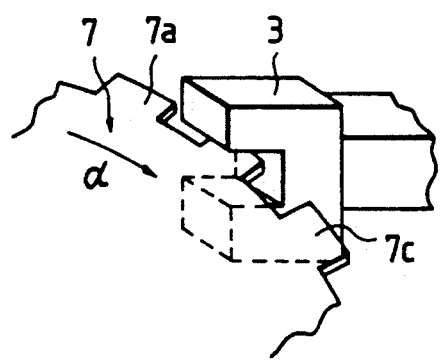
FIG. 4 is a perspective view showing the relation between a photointerrupter and a rotatable plate fixedly secured to a manual ring.

Secondly, a description will be made hereinbelow with reference to FIGS. 4 to 8 in terms of the manual focusing operation. First, the change-over switch Sw is switched to the manual focusing mode. Thereafter, with the image 40 in the view finder being viewed, the manual ring 4 is slowly rotated in the direction of the arrow $\alpha$ as illustrated in FIG. 4 so as to bring the object (for example) into the focus position. Thus, two of the teeth 7a to 7n of the light-shielding plate 7 approach the gap of the photointerrupter 3 whereby the light beam directed from the light-emitting diode LD to the light-receiving element PT is intermittently cut off so as not to reach the light-receiving element PT as illustrated in FIG. 5A. FIG. 5B shows the state that the light beam emitted from the light-emitting element LD reaches the light-receiving element PT through the notch portion between the successive teeth.

Here, although as described above the interval between the two photointerrupters 3a and 3b is set to $((182)+n)$ of the interval P of the adjacent teeth, when n=1, the position relation as illustrated in FIG. 6 is taken. That is, when the intermediate portion between the teeth 7a and 7b approaches the central portion of the photointerrupter 3a, the edge portion of the tooth 7c is positioned at the central portion of the photointerrupter 3b. Accordingly, when the manual ring 4 (or the light-shielding plate 7) is rotated in the direction indicated by the arrow $\alpha$ (forward direction), the output waveforms of the photointerrupters 3a and 3b respectively become as illustrated by (A) and (B) in FIG. 7, that is, the output waveform of the photointerrupter 3b is advanced in phase by 90° in electrical angle with respect to the output waveform of the photointerrupter 3a. On the other hand, when the manual ring 4 is rotated in the direction indicated by the arrow $\beta$ (the reverse direction), the output waveforms of the photointerrupters 3a and 3b respectively become as illustrated by (A) and (B) in FIG. 8. That is, the phase of the output waveform of the photointerrupter 3b is lagged by 90° in electrical angle with respect to that of the photointerrupter 3a.

The electric signals from the photointerrupters 3a and 3b which are in the aforementioned phase relation (and the variation speed) are supplied to the direction detecting circuit 5 illustrated in FIG. 2 which in turn outputs a control signal to the AF microcomputer 27. The AF microcomputer outputs an instruction signal to the motor driver 8 which in turn supplies a drive signal to the lens driving section 9. Thus, the focusing lens 2 is shifted by the amount corresponding to the rotational amount of the manual ring 4 in a direction indicated by an arrow A or B at the speed corresponding to the rotational speed of the manual ring 4, thereby allowing the real-time manual focusing operation.

Here, it is appropriate that in the above-described embodiment the motor driver 8 is arranged to include the drive circuit 28 as illustrated in FIG. 1. Further, it is also appropriate that, without using the AF microcomputer 27, a signal is directly supplied from the direction-detecting circuit 5 to the motor driver 8 so as to realize the manual focusing.

According to the above-descrobed embodiment of this invention, it is possible to provide a lens drive apparatus with a simple structure which has a high position accuracy without occurrence of the backlash, which is capable of performing the manual focusing operation at the real time and at the speed proportional to the rotational speed of the manual ring, and which is capable of moving the lens in accordance with the rotational direction of the manual ring to provide a mechanically manual sensation.

Figure 9:
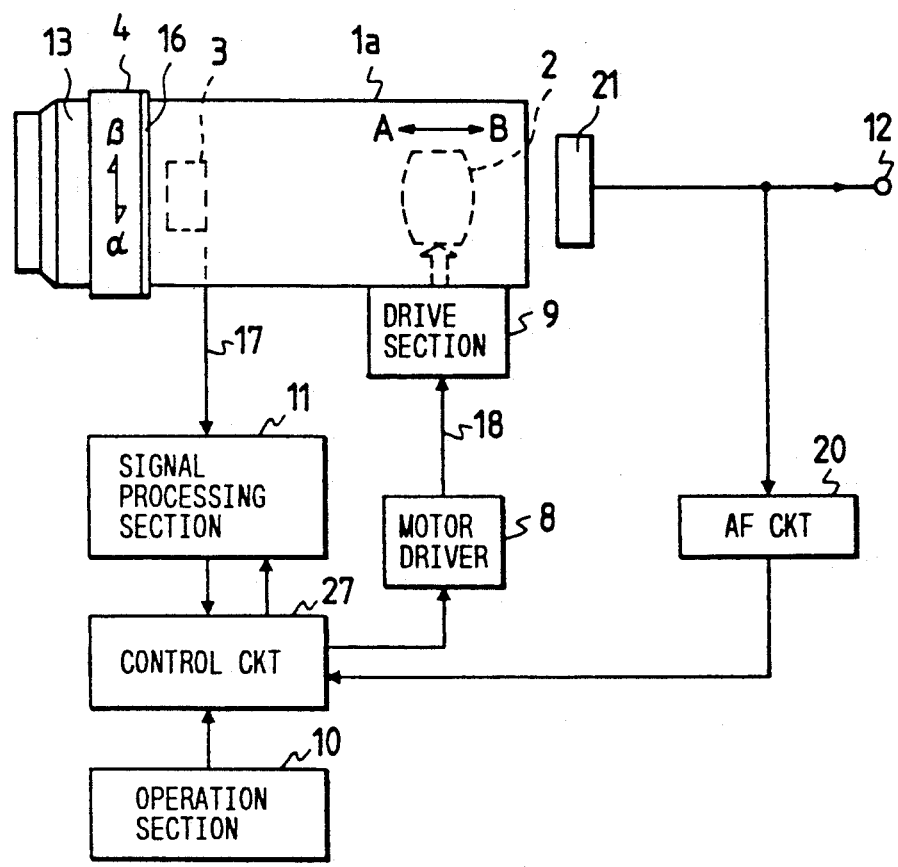
FIG. 9 is a block diagram showing a drive control apparatus according to another embodiment of this invention.

Further, a description will be made hereinbelow in terms of another embodiment of the present invention. FIG. 9 is an illustration of an arrangement of a drive control apparatus for an optical system of a camera according to the embodiment. In FIG. 9, illustrated at numeral 1a is a lens-mounting section of a camera housing which encases groups of lenses suitably arranged. Of the lens groups, one or more lenses (focusing lens) illustrated at numeral 2 is arranged to be movable by a lens driving section 9. Further, illustrated at numeral 4 is a manual ring which is at its rear side equipped with a circular edge portion (light-shielding plate 7) having a number of tooth portions 7a to 7n and a number of notch portions 7a' to 7n' which are successively arranged with a predetermined pitch P as illustrated in FIG. 3. Numeral 3 represents a photointerrupter section including two photointerrupters 3a and 3b arranged to be in a predetermined position relation to each other. The manual ring 4 and the two photointerrupters 3a, 3b are combined with each other so that the circular edge portion 7 of the manual ring 4 can be positioned in a gap between a light-emitting portion 3c and light-receiving portion 3d of each of the two photointerrupters 3a and 3b. In response to manually rotating the manual ring 4 in the direction indicated by the arrow $\alpha$ or $\beta$, the photointerrupter section 3 generates a signal involving information relating to the rotational direction of the manual ring 4 and the rotated amount thereof. The signal from the photointerrupter section 3 is supplied to a signal processing section 11.

Moreover, numeral 21 designates a photoelectric conversion element such as a CCD image sensor having a number of pixels. The output signal of the photoelectric conversion element 21 is supplied to an output terminal 12, and further to an auto-focusing control circuit (AF circuit) 20. The AF circuit 20 generates an auto-focusing control signal on the basis of the image signal component corresponding to a high spatial frequency component of the object to be taken by the camera, the auto-focusing control signal being led to a control circuit 27 comprising a microprocessor. The control circuit 27 performs the control to operate the respective portions of the camera in accordance with the operation mode set in an operation section 10. That is, for instance, in the case that the operation mode set in the operation section 10 is an auto-focusing operation mode, in response to the supply of the above-mentioned auto-focusing control signal from the AF circuit 20 to the control circuit 27, the control circuit 27 generates a pulse motor drive signal on the basis of the supplied auto-focusing signal to output it to a motor driver 8. In response to the motor drive signal, the motor driver 8 generates a motor drive pulse which is in turn supplied to a pulse motor provided in the lens drive section 9 so as to rotate the pulse motor. The aforementioned arrangement forms a closed loop from the lens drive section 9 through the focusing lens 2, photoelectric conversion element 21, AF circuit 20 and control circuit 27, motor driver 8 to the lens drive section 9, thereby allowing the auto-focusing control operation.

On the other hand, in the case that the operation mode set in the operation section 10 is a manual-focusing operation mode, the control circuit 27 performs the control so as not to cause the auto-focusing control signal generated by the AF circuit 20 to be supplied to the motor driver 8, and further, in response to the signal processing circuit 11 generating a displacement control signal on the basis of the output signal of the photointerrupter section 3 which includes the information relating to the rotational direction and rotated amount of the manual ring 4, the control circuit 27 generates a motor drive signal on the basis of the displacement control signal to output it to the motor driver 8. In response to the motor drive signal, the motor driver 8 outputs a motor drive pulse to the lens drive section 9 whereby the pulse motor is rotated. That is, this arrangement forms an open loop from the rotation of the manual ring 4 through the photointerrupter section 3, signal processing circuit 11, control circuit 27 and motor driver 8 to the lens drive section 9, thereby allowing the manual-focusing control operation.

Here, as described above, the output signals of the two photointerrupters 3a and 3b include the information relating to the rotational direction and rotated amount of the manual ring 4. That is, the rotational direction information is based upon the relative phase relation of the output signals of the two photointerrupters 3a and 3b on the time axis, and the rotated-amount information is based on the number of the edge portions of the output signals thereof which are developed on the time axis. Further, the number of the edge portions of the output signals of the two photointerrupters 3a and 3b which are developed within a predetermined time period can involve the information relating to the rotational speed of the manual ring 4. This means that it is possible to electrically control the moving direction and moving amount of the optical system on the basis of the output signals outputted from the photointerrupters 4a and 3b in response to the rotational operation of the manual ring 4. That is, a displacement control signal including the moving direction and moving amount of the optical system can be obtained on the basis of the edge portions of the output signals of the photointerrupters 3a and 3b corresponding to the rotional operation of the manual ring 4.

For detecting the position information and number information of the edge portions of the output signals of the photointerrupters 3a and 3b on the time axis, there are two methods: one is that the output signals of the photointerrupters 3a and 3b are used as clock signals and the other is that a different clock signal is used for the detection of the edge portions of the output signals thereof. If taking into account the error due to variation of the temperature characteristics of the circuit elements, it is preferable to detect the edge portions thereof in accordance with the latter method. Thus, in this embodiment, the detection of the edge portion is effected by using a clock signal with a period shorter than the time interval between the edge portions of the output signals of the photointerrupters 3a and 3b. In the case that the camera is equipped with a synchronizing signal generator, it is also appropriate to use as the clock signal the horizontal synchronizing signal.

FIG. 10 is a timing chart showing waveforms of signals to be used in this embodiment. In FIG. 10, (a) shows the output signal of the photointerrupter 3a, (b) shows the output signal of the photointerrupter 3b, (c) illustrates a clock signal with a period shorter than the time interval between the edge portions of the output signals of the photointerrupters 3a and 3b on the time axis, and (d), (e) respectively illustrate edge portion signal detected on the basis of the clock signal (c).

Figure 11:
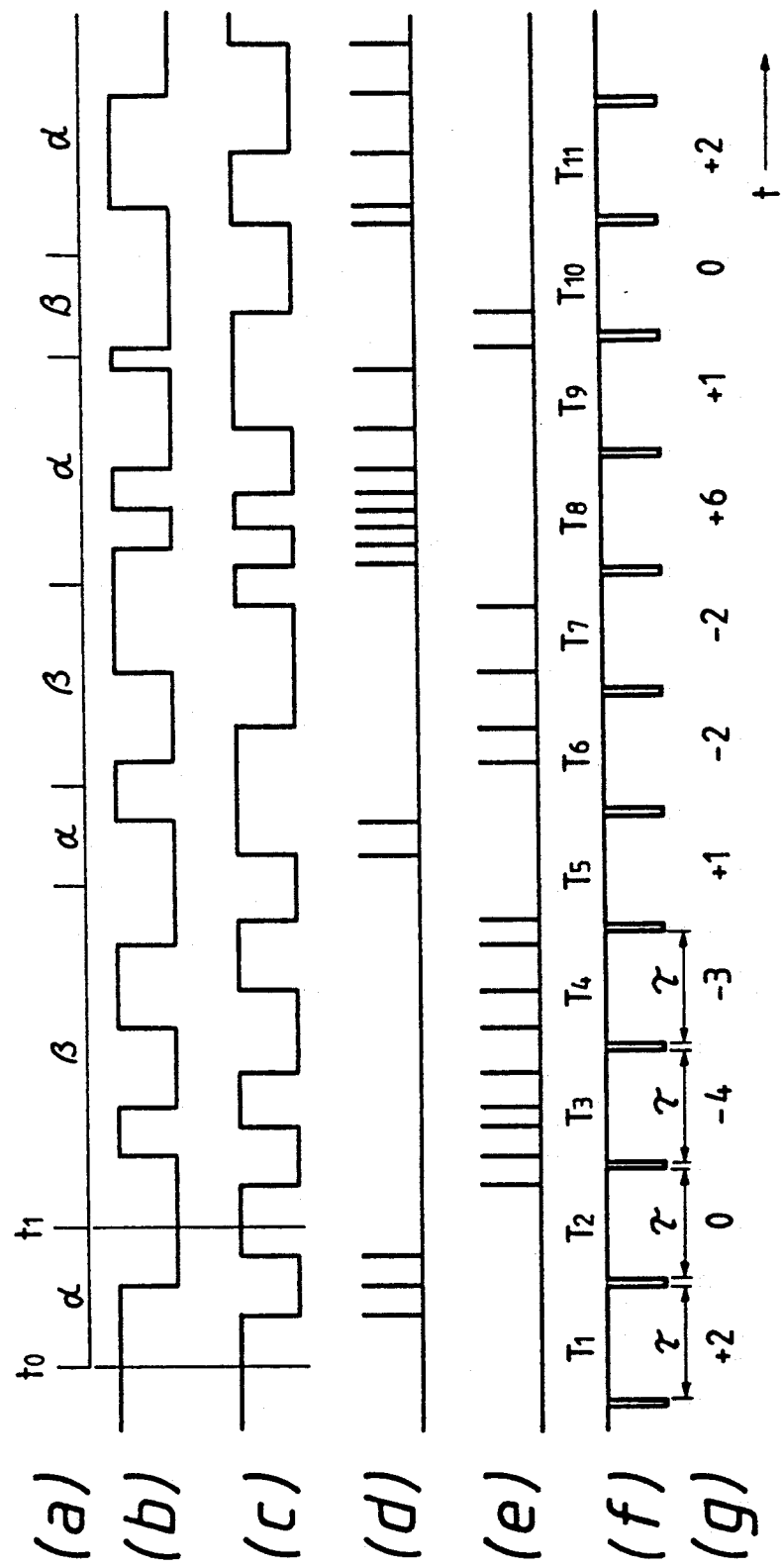

FIG. 11 is an illustration of signals to be generated in response to a rotation mode of the manual ring 4 on the time axis as indicated by (a). In FIG. 11, (b) represents the output signal of the photointerrupter 3a to be generated in response to the manual ring 4 rotation mode (a), (c) designates the output signal of the photointerrupter 3b to be generated in response to the rotation mode (a), (d) indicates edge portion signals corresponding to the edge portions of the output signals of the photointerrupters 3a and 3b when the manual ring 4 is rotated in the direction α, (e) denotes edge portion signals corresponding to the edge portions of the output signals of the photointerrupters 3a and 3b when the manual ring 4 is rotated in the direction β, (f) depicts signals to be periodically generated, and (g) represents accumulation values of the edge portion signals (d) and (e) to be obtained on the basis of the periodic signals (f). The output signals (b) and (c) of the photointerrupters 3a and 3b respectively take high-level state when the light-receiving portion 3d is optically communicated with the light-emitting portion 3c and take low-level state when being not communicated therewith.

In FIG. 11, in the period from the time $t_o$ to the time $t_I$, the output signals of the photointerrupters 3a and 3b respectively take the high-level states at the time $t_o$, while, because the manual ring 4 is rotated in the direction α, the output signal (c) of the photointerrupter 3b then varies from the high-level state to the low-level state and the output signal (b) of the photointerrupter 3a thereafter varies from the high-level state to the low-level state. That is, in the case that the output signal (c) varies from the high-level state to the low-level state previous to the output signal (b) under the condition that the output signals (b) and (c) are initially in the high-level states, this means the manual ring 4 is rotating in the direction α. On the other hand, in the case that the output signal (b) of the photointerrupter 3a first varies from the high-level state to the low-level state and the output signal (c) of the photointerrupter 3b then varies from the high-level state to the low-level state, this means that the manual ring 4 is rotating in the direction β.

In the state that the camera is in the manually operated state, when the output signals (b) and (c) are outputted from the photointerrupters 3a and 3b through a signal line 17 (through a single line is shown in FIG. 9, plural conductors are practically wired) to the signal processing section 11, the signal processing section 11 generates an edge portion signal corresponding to each of the edge portions of the output signals (b) and (c) on the basis of the shorter-period clock signal, and further detects the rotational direction of the manual ring 4 on the basis of the relative phase of the edge portion signals.

The signal processing section 11 is arranged so as to treat as plus 1 each edge portion signal generated when the manual ring 4 is rotated in one direction (α or β) and to treat as minus 1 each edge portion signal generated when the manual ring 4 is rotated in the other direction (β or α). In addition, the signal processing section 11 totalizes or accumulates the edge portion signals which appears within a predetermined time period as indicated by τ in (f) in FIG. 11 so as to output the totalized value to the control circuit 27 at the timing of the front edge (leading edge) of each of the periodically generated signals (acting as a timer) as illustrated by (f) in FIG. 11 and further to reset the previous totalized value in response to the rear edge (trailing edge) of the periodically generated signal. This totalized values corresponds to the displacement control signal including the information relating to the moving direction and moving amount of the optical system (focusing lens) of the camera. As the predetermined time period τ is set to be shorter, the displacement of the optical system due to the pulse motor can more adequately be responsive to the manual rotational operation of the manual ring 4 without a time lag. If the camera is provided with a synchronizing signal generator, it is possible to use the vertical synchronizing signal in place of the periodically generated signal. In this case, the predetermined time period becomes 1/60. sec. in NTSC. In FIG. 11, T1 to Tn are time periods covering the predetermined time period τ.

FIG. 11 (g) illustrates examples of the totalized value of the edge portion signals for each predetermined time period τ, where the totalized value is +2 for the time period T1, 0 for the time period T2 and −4 for the time period T3. The totalized values for the time periods T1 to Tn are successively and independently supplied as the displacement control signals, each including the information of the moving direction and moving amount of the optical system, to the control circuit 27, which in turn generates a drive signal for driving the pulse motor in correspondance with the displacement control signal therefrom, the drive signal being supplied to the motor driver 8. The drive signal is for rotating the pulse motor by the step number corresponding to the totalized value in the rotational direction corresponding to the sign of the totalized value. Further, the drive signal is arranged to be supplied to the motor driver 8 at the time period next to the time period involving the corresponding edge portion signals. The drive signal is amplified in the motor driver 8 so as to be led as a motor drive pulse to the pulse motor of the lens drive section 9, thereby allowing the displacement of the optical system.

Here, because the manual ring 4 is arranged to be manually rotated, there is the possibility that the frequency of the motor drive pulse generated on the basis of the totalized value for each of the time periods T1 to Tn becomes higher than the response frequency of the pulse motor. Further, if the frequency of the motor drive pulse becomes higher than the pulse motor response frequency, difficulty is encountered to adequately rotate the pulse motor whereby the position information of the optical system stored in the control circuit 27 can be different from the actual position of the optical system. Thus, in opposition to the case that the totalized value obtained can cause the frequency of the motor drive pulse to become higher than the response frequency of the pulse motor, i.e., the case that the totalized value exceeds a predetermined value, the drive control apparatus of this embodiment is arranged so that the control circuit 27 limits its output value so as not to cause the frequency of the motor drive pulse to exceed the maximum response frequency of the pulse motor. That is, the motor drive pulse is supplied to the pulse motor at the time period next to the time period involving the edge portion signals used for obtaining the totalized value.

Figure 12:
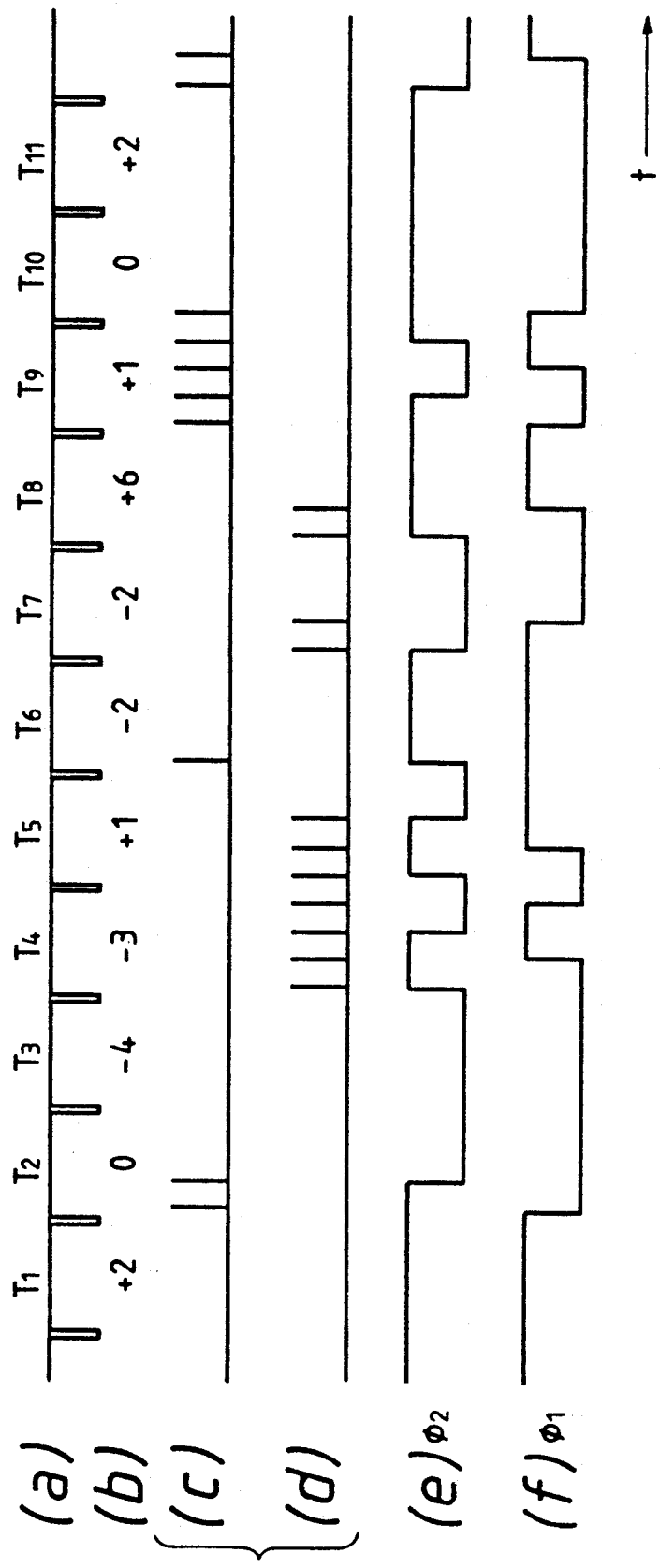

If the pulse motor provided in the lens drive section 9 is of the two-phase exciting type, the rotational direction and step number (rotated amount) of the pulse motor are determined on the basis of the two-phase drive signals φ1 and φ2. FIG. 12 shows the motor drive signal to be generated by the control circuit 27 in accordance with the displacement control signal corresponding to the totalized value for each of the time periods T1 to Tn and the two-phase drive signals to be generated in the case that the pulse motor is of the two-phase exciting type. In FIG. 12, (a) corresponds to (f) in FIG. 11, (b) corresponds to (g) in FIG. 11, (c) represents a drive pulse for rotating the pulse motor in one direction (plus direction), (d) designates a drive pulse for rotating the pulse motor in the opposite direction (minus direction), and (e), (f) respectively denote the two drive signals φ2, φ1 having different phases.

The motor drive pulses (c) and (d) are respectively arranged to have constant periods to which the pulse motor can be responsive, that is, which are set to the vicinity of the inverse number of the maximum response frequency of the pulse motor. Further, the drive pulse (c) for the plus direction and the drive signal (d) for minus direction respectively correspond to the totalized values of the edge portion signals obtained at the time periods immediately before the time periods that the drive pulses are generated. That is, as seen from FIG. 12, for instance, the plus-direction drive pulse corresponding to the totalized value +2 (see (b)) of the edge portion signals obtained at the time period T1 are generated at the next time period T2 (see (c)) and the drive pulse is not generated at the time period T3 in response to the totalized value 0 obtained at the time period T2.

On the other hand, although the totalized value at the time period T8 is +6, the drive pulse to be generated at the next time period T9 is arranged so as to correspond to a predetermined totalized value (in this case, +4). That is, in the case that the frequency of the drive pulse to be generated becomes higher than the response frequency of the pulse motor, if the totalized value corresponding to the maximum allowable response frequency is +4 (or −4), the drive pulse is generated at the next time period in correspondance with the predetermined totalized value +4 (or −4) irrespective of the totalized value obtained.

Thus, according to this embodiment, even if the manual ring 4 is manually rotated with any rotation mode so that the signal processing section 11 outputs a totalized value to cause the frequency of the motor drive pulse to become higher than the maximum allowable response frequency of the pulse motor, the control circuit 27 automatically changes the outputted totalized value to a predetermined value and outputs a drive pulse in accordance with the predetermined value, thereby preventing the occurrence of difference between the position information of the optical system stored in the control circuit 27 and the actual position thereof so as to ensure accurate movement of the optical system of the camera.

Although the description of the above-described embodiments have been made in terms of the focusing operation, this invention is also applicable to the zooming operation in which the movement of a zoom lens covered by the camera housing is controlled by means of another manual ring. In addition, although in the above-described embodiments the optical means comprising the light-shielding plate with a plurality of teeth and the photointerrupters is arranged to detect the rotation of the manual ring, it is also appropriate to detect the rotation of the manual ring by means of a magnetic means comprising S and N magnetic poles, provided over the circumference of the manual ring, and magnetic sensors provided to be in confronting relation to the S and N magnetic poles.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A drive control apparatus for an optical system of a camera having at least one of a focusing function and zooming function, comprising:

driving means including a pulse motor to drive said optical system in directions along an optical axis of said optical system in accordance with a drive control signal;

a manual ring rotatable by a manual operation;

displacement signal generating means coupled to said manual ring so as to generate a displacement signal including information relating to a moving direction and moving amount of said optical system in correspondance with the rotation of said manual ring;

drive control means coupled to said displacement signal generating means so as to totalize said displacement signals generated at every predetermined time period to output said drive control signal to said driving means on the basis of the totalized value of said displacement signals when the totalized value is below a predetermined value and output said drive control signal thereto on the basis of said predetermined value when the totalized value exceeds said predetermined value.

2. A drive control apparatus as claimed in claim 1, wherein said drive control means controls said driving means so that said pulse motor is driven in accordance with said drive control signal at the predetermined time period next to the predetermined time period that said drive control signal is obtained.

3. A drive control apparatus as claimed in claim 1, wherein said displacement signal generating means includes a rotatable plate rotatable in response to the rotation of said manual ring and having a plurality of tooth portions and further includes at least two optically detecting devices each equipped with a light-emitting portion and a light-receiving portions between which said plurality of tooth portions of said rotatable plate pass, said displacement signal generating means generating said displacement signal on the basis of the output signals of the two optically detecting devices.

4. A drive control apparatus as claimed in claim 3, wherein the two optically detecting devices are disposed to be separated from each other by a distance which is $((\frac{3}{4})+n)$ times the interval of the adjacent tooth portions of said rotatable plate.

* * * * *